United States Patent Office 3,391,301
Patented July 2, 1968

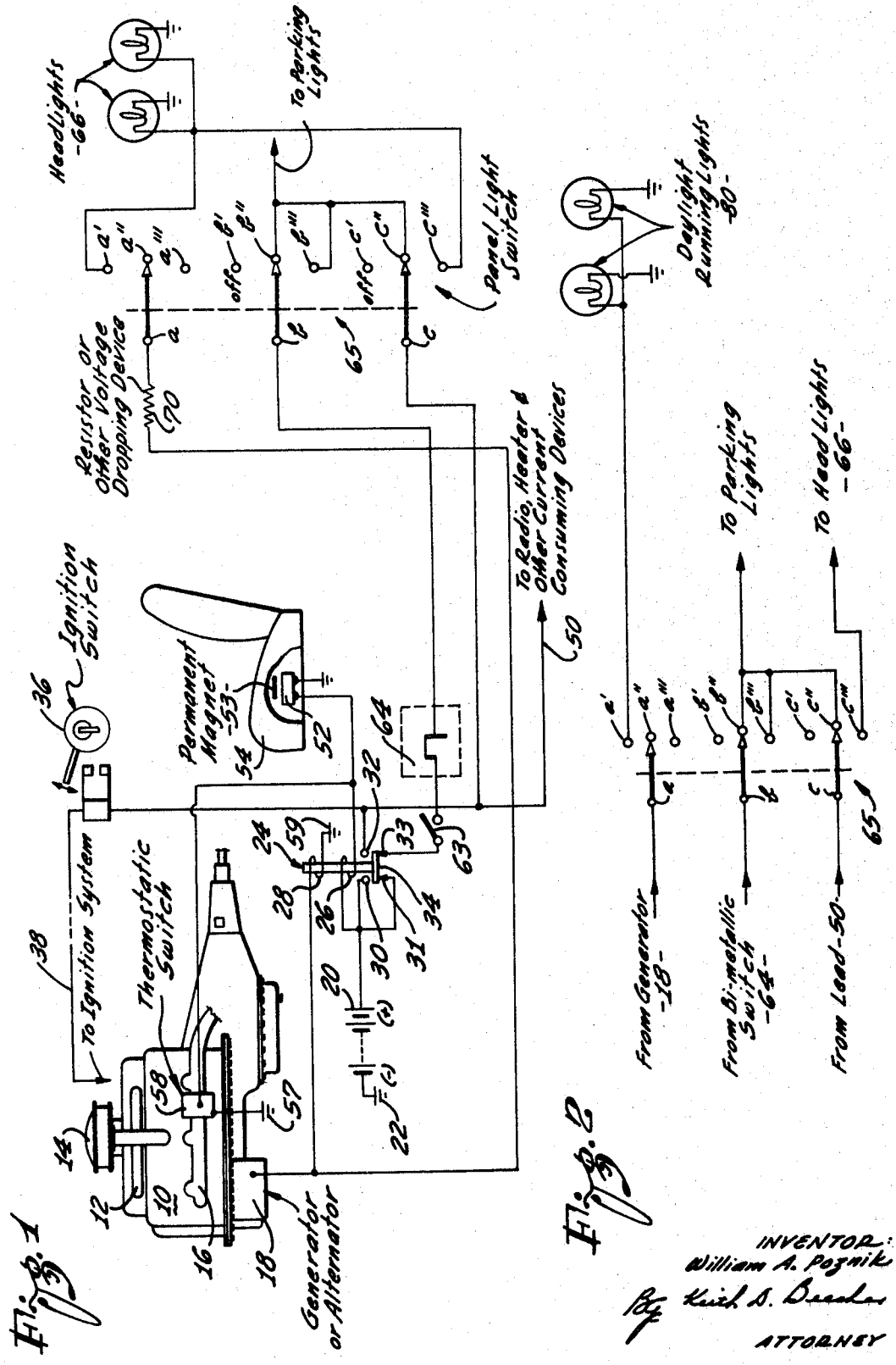

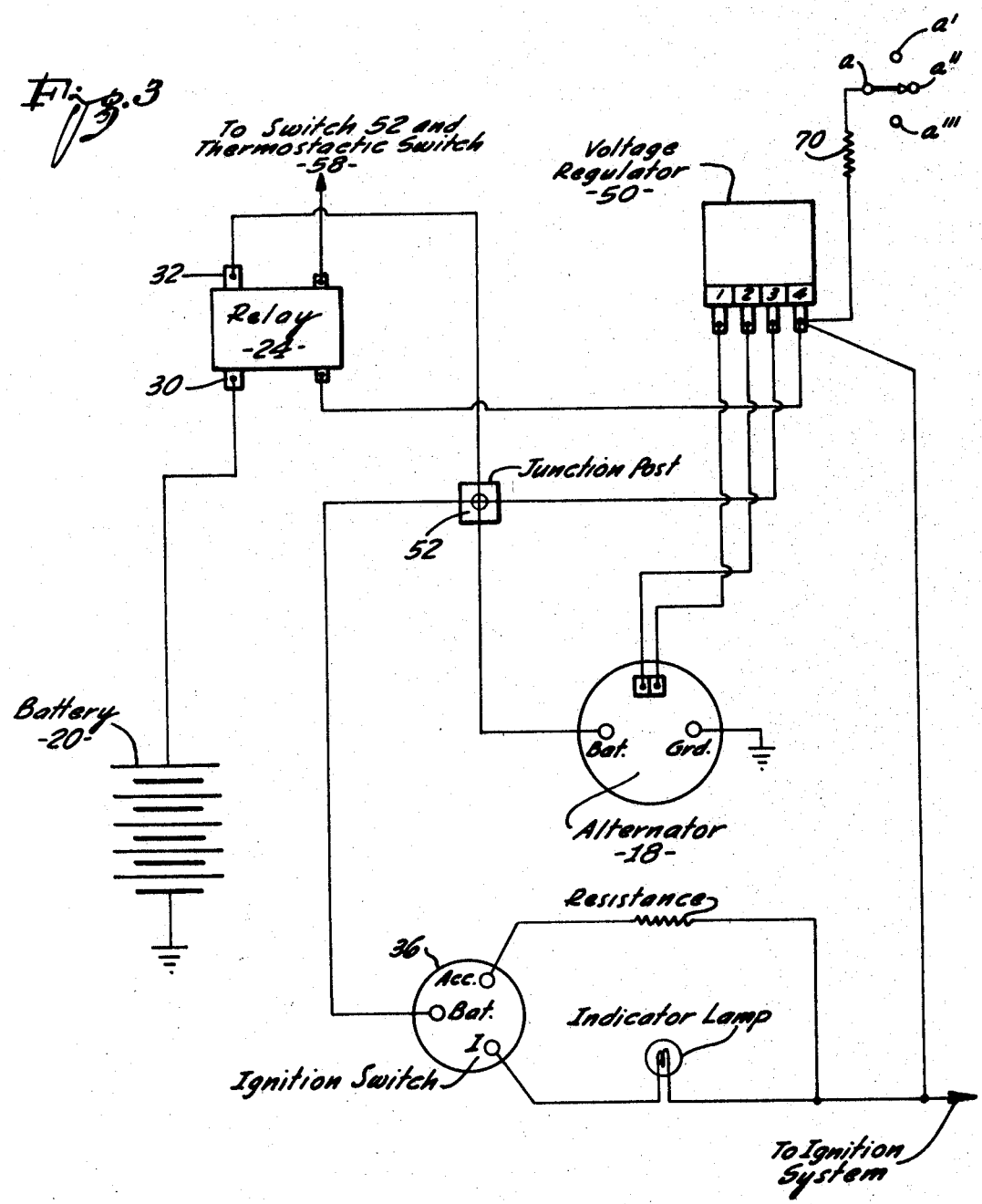

3,391,301
ELECTRICAL CONTROL SYSTEM FOR
MOTOR VEHICLE
William A. Poznik, 1710 Harper Ave.,
Redondo Beach, Calif. 90278
Continuation-in-part of application Ser. No. 512,486,
Dec. 8, 1965. This application Sept. 6, 1966, Ser.
No. 577,263
4 Claims. (Cl. 315—83)

ABSTRACT OF THE DISCLOSURE

A motor vehicle control system is described herein which is capable automatically of turning on the lights of a motor vehicle when the vehicle is operated, either by day or by night, for safety purposes. The system also functions automatically to turn off the lights when the vehicle is stopped, and other conditions have been fulfilled.

---

The present invention relates to electrical systems for motor vehicles, and it is especially concerned with an electrical safety system for a motor vehicle which will energize the head lamps of the vehicle automatically, whenever the vehicle is in operation.

This application is a continuation-in-part of copending application Ser. No. 512,486, which was filed Dec. 8, 1965, now abandoned.

Daytime running lights and headlights used in the daytime have been so used with several purposes in mind. These include: (a) to remind drivers to be careful; (b) to attract attention and make other drivers aware of the presence of a moving vehicle; (c) to increase visibility in the presence, for example, of fog, smoke, shade, glare, lack of contrast; (d) to indicate the direction of travel, i.e., that the vehicle ahead is actually approaching. All the purposes listed above have, of course, as their ultimate objective to reduce traffic accidents during daylight hours.

The use of running lights for the above stated purpose, as well as the practice of turning on headlights during daytime, has become the practice in several States, for example, during major holidays. Also several national companies and associations, including the American Legion, have initiated campaigns recommending the practice.

For example, the Illinois Secretary of State has installed running lights on all State cars, and the city of Indianapolis plans to install running lights on its nearly 1,000 vehicles. Florida school buses have mechanisms which automatically turn on the headlights when a certain speed is attained. Also, the California Highway Patrol uses headlights when responding to calls; and the fire department of at least one California city uses headlights when responding to daytime calls.

As far as is known, there is no law in any State which specifically prohibits the use of running lights on motor vehicles. However, there are laws in several States, for example, setting specifications for headlights and limiting the number of lights which may be shown at night which, except for the provisions of the present invention as will be described, would tend to discourage the use of running lights in such States.

The fundamental purpose for the system of the invention is to enhance and control the electrical equipment of a motor vehicle so as to increase highway operating safety, to eliminate hazardous operating situations, and to introduce additional convenience as a direct by-product of the invention.

A particular feature of the improved system of the invention is its proven reliability, as well as its being economical to construct and install, and its being completely acceptable to motorists.

Another feature of the invention is its compatibility with all present electrical devices and systems and circuits in a motor vehicle.

Two national bus companies have recently instituted a policy, whereby all of their buses are driven with their headlights in an energized condition, even in the day time. It has been found that this policy has reduced materially the accident incident rate of the buses. Further, two major airlines have voluntarily instituted a policy whereby all of their aircraft keep their running lights energized at all hours even when parked.

Because of the success of these companies' policies, many motorists have acquired the habit of turning their headlights on, even during daylight hours, whenever their motor vehicle is in operation.

This desirable safety practice of driving with the headlights on, however, poses problems for all drivers. That is, the drivers must remember to turn on their headlights during the daylight hours. They must also remember to turn off their headlights when the motor vehicle is not in use, and this is sometimes difficult during daylight hours when the headlights themselves are not noticeable.

Furthermore, there is a problem in that the continuous utilization of headlights at their rated intensity, quickly uses up the expected service life of the lamps. This not only creates an expense and inconvenience to the motorist, but also can result in a hazardous condition when one of the headlights burns out and is not immediately noticed.

As will be described, a further feature of the present invention is that it permits the headlights to be operated at a reduced intensity when not in normal use, so that their expected service life is not diminished by their continuous operation.

An additional feature of the invention is that the system does not impose any new demands on the driver. That is, no setting or resetting of switches is necessary. The performance of the system of the invention is fully automatic and repetitive.

The systems described, for example, in the present inventor's prior Patent 2,806,150, which issued Sept. 10, 1957; and in the present inventor's copending application Ser. No. 350,733, now U.S. Patent No. 3,321,663 which was filed Mar. 10, 1964; are suitable for protecting the motorist in a situation wherein the motorist forgets to turn off his headlights when he reaches his destination.

The systems described and claimed in the aforesaid patent and copending application function to turn off the headlights, or other electrical appliance of a motor car, automatically, at a predetermined time after the car has been stopped, and the driver has left the vehicle. The purpose for the protective control systems described and claimed therein is to prevent the battery of the motor car from becoming drained, due to the operator inadvertently leaving his lights, or other electrical appliances, in an "on" condition.

The system of the present invention may include a protective control system, such as those referred to above. In addition, the system of the invention provides that the main headlights, or auxiliary running lights, of the vehicle are automatically turned on, whenever the vehicle is in operation, and are turned off automatically when the vehicle is not in operation or use.

A further feature of the system of the invention provides, for example, that when the main headlights are automatically controlled to be turned on when the vehicle is in operation, these are energized at a reduced intensity, unless actually turned on by the panel switch, so that the life of the components will not be unduly impaired.

Other features, objects and advantages of the invention will become apparent from a consideration of the following description, when the description is taken in conjunction with the accompanying drawings, in which:

FIGURE 1 is one embodiment of the improved electrical system of the present invention, and which includes particular control effects described and claimed, for example, in the aforementioned patent and copending application;

FIGURE 2 is a fragmentary circuit showing a modification of the control system of FIGURE 1, whereby auxiliary lights are used to be energized during day time operation of the vehicle; and FIGURE 3 is a fragmentary circuit showing a modification of the control system of FIGURE 1, whereby the system of the invention may be satisfactorily installed in conjunction with a particular type of voltage regulated electrical system in a motor vehicle.

Referring now to FIGURE 1, there is illustrated therein an internal combustion engine such as used in most automobiles, and this engine is indicated generally as 10. The engine 10 is provided with a usual intake manifold 12 which supplies the fuel to the carburetor 14.

The engine 10 also includes an exhaust manifold 16 and an electric current generator, or alternator, which forms a first source 18 of electric power for the system of the invention, as well as for the power consuming components of the motor car.

The system of FIGURE 1, as mentioned above, is generally similar to the control system shown in the aforesaid patent and patent application. The system includes a battery 20 which may be a usual storage battery. One terminal of the battery is connected to the frame of the motor vehicle, so as to constitute the common connection, or ground, of the electrical system. This common connection is indicated in FIGURE 1 as the ground 22.

The control system of FIGURE 1 also includes a solenoid switch 24 of any known type. The solenoid switch has a first actuating winding 26 and a second actuating winding 28. The solenoid assembly also includes a pair of normally-open contacts 30 and 32, and a pair of normally-closed contacts 31 and 33.

The contacts 30 and 32 are closed when the solenoid is energized, and the contacts 31 and 33 are opened. This occurs when either of the windings 26 or 28, or when both the windings, are energized.

The normally-open contacts 30 and 32 are connected between the ungrounded terminal of the battery 20 and one terminal of a standard key-operated ignition switch 36. The other terminal of the ignition switch 36 is connected to the ignition circuit of the engine. Since this circuit forms no part of the present invention, it is not shown. The connection to the ignition switch system is by way of a lead 38.

The normally-open contacts 30 and 32 are also connected between the ungrounded terminal of the battery 20 and a lead 50. The lead 50 is connected to various current consuming devices of the vehicle, such as the radio, heater, and other accessories.

The normally-closed contacts 31 and 33 are connected between the ungrounded terminal of the battery 20 and a manually operated switch 63. The switch 63 is connected in series with a bi-metallic switch 64. The bi-metallic switch 64 is of usual flasher construction, and it functions in a manner such that when a current is passed through the switch, it is alternately actuated between an "on" and an "off" condition at regular intervals.

The switch 64 is also connected to one moving contact of a switch 65. The switch 65 is mounted on the panel of the vehicle, and functions as the usual headlight control switch.

The switch 65 has three movable contacts designated $a$, $b$ and $c$. Each of these contacts has three distinct positions. When the switch 65 is in a first position, the contact $a$ is connected to a fixed contact $a'$ which, in turn, is connected directly to the headlights 66 of the vehicle. The other two contacts $a''$ and $a'''$ contacted by the movable contact $a$ are open circuit.

Likewise, when the switch 65 is in a first position, the movable contact $b$ contacts an open circuited fixed contact $b'$. However, when the switch is in either the second or third positions, the movable contact $b$ contacts the fixed contact $b''$ or $b'''$, and both these latter contacts are connected to the parking lights of the vehicle. The bi-metallic switch 64 is connected to the movable contact $b$ of the switch 65.

Moreover, when the switch 65 is in its first position, the movable contact $c$ connects with an open-circuited fixed contact $c'$. However, when the switch is in the second position, the movable contact $c$ connects with a fixed contact $c''$ which is connected to the parking lights. Likewise, when the switch is in the third position, the movable contact $c$ engages a fixed contact $c'''$ which is connected to the headlights.

It will be appreciated that when the normally-open contacts 30 and 32 are closed, the headlights 66 of the vehicle may be operated in a normal manner. For example, when the switch 65 is set to the second position, the contact $c$, which is connected back to the contact 32, engages the fixed contact $c''$, so as to energize the parking lights. Likewise, when the switch 65 is in the third position, the movable contact $c$ engages the fixed contact $c'''$ so as to energize the headlights 66.

Also, when the movable contact $c$ engages the contact $c'$, the switch 65 being in its first position, the headlights 66 would normally be off, except under the control of the system of the present invention, as will be described.

It will also be appreciated that so long as the contacts 30 and 32 are closed, the ignition switch 36 can be operated, so as to establish an energizing circuit to the ignition system of the vehicle.

The control system shown in FIGURE 1 also includes a magnetic reed switch 52 which is mounted under the driver's seat 54 of the vehicle, in accordance with the concepts of the control system described in the copending application, and which constitutes a magnet operated switch.

A permanent magnet 53 is also imbedded in the driver's seat. Whenever the driver sits in the driver's seat, the permanent magnet 53 is brought into the vicinity of the magnet operated switch 52, so that the switch 52 is actuated. When the switch is actuated, it closes its electrical contacts. One of the contacts of the switch 52 is grounded, as at 56, and the other is connected through the energizing winding 26 of the solenoid 24 to the ungrounded terminal of the battery 20.

As noted, the reed switch 52 is actuated by the permanent magnet 53. The switch 52 and the permanent magnet are positioned within the seat in such a manner that so long as no one sits over the switch on the seat, the switch will not be operated. However, when someone, such as the driver, sits on the seat, the magnet 53 is brought adjacent the switch 52 to operate the switch. This energizes the solenoid 24, so as to cause the contacts 30 and 32 to close.

Also, in accordance with the control system described in the aforesaid patent, a thermostatic switch 58 of known construction is mounted, for example, on the exhaust manifold 16 of the engine 10. Whenever, the exhaust manifold is above a threshold temperature, the switch 58 operates, so as to energize the solenoid 24 through its winding 26, and thereby close the contacts 30 and 32.

The alternator 18 is also connected to the winding 28 of the solenoid, so that so long as the vehicle is running, the solenoid will be energized. Also, and in accordance with the concepts of the present invention, the alternator 18 is connected through a resistor 70, or other voltage dropping device, to the moving contact $a$ of the switch 65.

It is evident from the description above, that so long as the motor vehicle is operating, the alternator 18 will energize the solenoid 28, so that the lights of the motor vehicle can be operated normally. This also applies whenever one is sitting in the driver's seat, since the switch 52 then causes the solenoid 24 to be energized. When the solenoid is energized, the contacts 30 and 32 are closed, so that the ignition system of the vehicle can be operated, as well as the other auxiliary current consuming devices. Also, the headlights 66 can be operated through the moving contact c of the switch 65.

However, when the driver leaves the vehicle, and after the engine has cooled down sufficiently to open the thermostatic switch 58, the solenoid 24 becomes de-energized. Now, when the switch 65 has been set to the parking condition, the moving contact b through the switch 64, causes the parking lights to flash.

Also, and in accordance with the concepts of the present invention, when the switch 65 is set to the normal "off" condition, such as in normal daylight driving, and the vehicle is operated, then, the generator 18 supplies power to the headlights 66 through the moving contact a of the switch 65 and by way of the fixed contact a'. This power is at a reduced level, so as to prolong the life of the components and to present a preferred level of light intensity for the intended purpose, due to the inclusion of the dropping resistor 70. However, should the headlights be switched by the switch 65 to the parking light, or full headlight condition, the aforesaid control on the headlights 66 is terminated.

It will be appreciated that with the control shown in FIGURE 1, whenever the car is in operation, the headlights will be energized, even though the switch 65 is at the "off" position. Then, as soon as the car has stopped, and the engine is turned off, the headlights will be automatically turned off.

Also, due to the control described in the aforementioned patent application and patent, the turning off of the headlights is carried out automatically, even though the switch 65 is switched to the full headlight or parking light condition.

In the particular embodiment, the parking lights are then caused to flash, when the switch 63 is closed. It will be understood, of course, that the switch 63 can be opened, so that the lights will be turned off completely when the control system operates, and no flashing control will be realized.

It will be appreciated that a simple circuit could be provided in conjunction with the switch 65, so that when the headlights 66 are under the control of the moving contact a, they are in a series circuit condition, and when they are under the control of the moving contact c, they are in a parallel condition. In this manner, the reduced level of intensity could be achieved for the headlights without the need for the resistor 70, or equivalent voltage dropping device.

In the circuit of FIGURE 2, daylight running lights 80 are provided, and these are connected to the fixed contact a' of the switch 65. These running lights may be separate from the headlights 66, and are used only for day time driving. For that purpose, the alternator 18, which is connected to the moving contact a, causes the running lights 80 to be energized, whenever the switch 65 is in its normal "off" position. However, when the switch 65 is in either of its other positions, it causes the main headlights 66, or the parking lights of the vehicle to be activated, and the same control is provided, as described in conjunction with FIGURE 1.

It will be appreciated, therefore, that the control system of the present invention serves to connect the headlights, or running lights, of the vehicle to a first source of electrical energy, such as the alternator (or generator), when the headlight switch is "off," so that the headlights may be energized whenever the vehicle is in operation. In addition, the control system serves to connect the headlights to a second source of electrical energy, in this case the battery/alternator combination, whenever the headlight switch is on. The latter connection can be protected by suitable protective circuits, as described.

The invention provides, therefore, an improved electrical system for a motor vehicle, whereby the headlights of the vehicle are energized automatically, whenever the vehicle is in operation. The improved control system provides for the headlights automatically to be come de-energized when the vehicle is stopped and the engine is turned off.

As described herein, it is preferable for the electrical system of the invention to incorporate the control system described in the aforesaid patent and copending application, so that complete overall protection to the electrical system of the vehicle is realized.

It should also be noted that the running lights can be any size, color, location or number so as to comply with vehicle codes in the different states, and to meet consumer preferences.

In the circuit of FIGURE 1, the switch terminal a is shown as connected through the resistor 70 directly to the alternator 18. However, in the electrical systems of some vehicles, the voltage regulation is such that the alternator, regulator and battery are connected in such a manner, that battery power is supplied to the alternator terminal when the vehicle is stopped.

Under the above described conditions, a connection from the battery directly to the alternator terminal, as is the case in the circuit of FIGURE 1, would mean that the car headlights would be energized when the vehicle is stopped, and the engine is switched off. This, of course, is not wanted.

The circuit of FIGURE 3 shows a typical voltage regulated system of the type being considered.

In the system of FIGURE 3, the battery 20, alternator 18, and a terminal 3 of a voltage regulator 50 are all connected to a common junction point 52. As shown, the voltage regulator 50 includes four terminals, numbered 1, 2, 3 and 4.

The terminals 3 and 4 of the voltage regulator unit 50 are associated with a field relay in the regulator, and this relay closes immediately upon the start of the engine. When the field relay contacts close, the system voltage is applied from the common junction point 52 to terminal 4 of the voltage regulator, and through the resistor 70 to the switch contact a. The closure of the field relay contacts also supplies the holding current to the relay 24 (holding winding 28 in FIGURE 1). Only when the relay 24 is energized, in the manner described in conjunction with the circuit of FIGURE 1, is the battery voltage applied to the common junction 52. With the engine running the alternator supplies voltage to the common junction 52.

The terminals 1 and 2 of the voltage regulator 50 operate in known manner to energize the field winding of the alternator 18, so that the alternator may generate a charging voltage for the battery 20, whenever the battery voltage falls below the alternator voltage.

It will be appreciated that only when the engine is running the field relay contacts are closed, so that an energizing current may then be supplied to the headlights by way of terminal 4 and the switch terminal a. When the engine is stopped, the field relay contacts of the voltage regulator 50 automatically open, so that the headlights are automatically de-energized, as is desired.

The modification to the system, as shown in FIGURE 3, therefore obviates the situation in which the running lights of the vehicle would be energized whenever battery power is available beyond the master switch, whether or not the engine is running. As pointed out previously, this situation can occur in systems in which the alternator and battery share a common electrical junction post.

As also described, the modificaton in FIGURE 3 makes use of the switching function of the voltage regulator 50, this being a commercially obtainable well-known item. After the engine is started, the voltage output of the alternator 18 immediately closes the field relay within the voltage regulator 50, and thereby provides electric power at the voltage regulator terminal 4. Electric power is now available for the running lights through the resistor 70 and the switch terminal "a," but this power is available only when the engine and alternator are running.

It is obvious that other isolation means could be used to achieve the results of the modification of FIGURE 3. However, these alternate circuits would involve additional circuitry and electrical components which would add to the cost and complexity of the system.

It should be noted that in the use of reduced intensity headlights during daytime in the practice of the invention in one of its above described embodiments, does not have a tendency to cause motorists inadvertently to rely on them at night when normal intensity should be used. This is because, at night or when night falls, the motorist driving with his headlights at reduced intensity will be unable to see his instrument board because it is not lit. He will then automatically react exactly as he would in a car not equipped with the system, and turn his headlights on to normal intensity which, of course, at the same time turns on the instrument panel lights.

It will be appreciated that while particular embodiments of the invention have been described, modifications may be made. It is intended in the claims to cover all modifications which come within the scope of the invention.

What is claimed is:

1. An electrical system for a motor vehicle including: a first source of electrical energy for producing electrical power whenever the vehicle is in operation, said first source including an electric current generating means driven by the vehicle; a second source of electrical energy for producing electric power under further predetermined operating conditions of said vehicle, said second source including said electric current generating means, and further including a rechargeable battery, and a voltage regulator intercoupling said current generating means and said battery, said battery and said current generating means being electrically connected to a common terminal; an electrical head lamp assembly; and switching means having a first position connecting said head lamp assembly to said first source and having a second position connecting said head lamp assembly to said second source; and relay means included in said voltage regulator having contacts connected to said common terminal and to said switching means for supplying power to said switching means only when said current generating means is operating.

2. The electrical system defined in claim 1 in which said head lamp assembly includes main headlights and running lights, and in which said switching means selectively connects said running lights solely to said first source and said main headlights solely to said second source.

3. The electrical system defined in claim 1, in which said head lamp assembly includes main headlights, and in which said switching assembly selectively connects said main headlights to said first source and to said second source.

4. The electrical system defined in claim 3 and which includes a voltage dropping means inserted in circuit with said first source.

References Cited

UNITED STATES PATENTS

| | | | |
|---|---|---|---|
| 2,806,150 | 9/1957 | Poznik | 307—10 |
| 3,201,644 | 8/1965 | Simpson | 315—83 |
| 3,262,011 | 7/1966 | Cones | 315—82 |

JAMES W. LAWRENCE, *Primary Examiner.*

R. L. JUDD, *Assistant Examiner.*